United States Patent [19]

Shimizu et al.

[11] Patent Number: 4,968,134
[45] Date of Patent: Nov. 6, 1990

[54] OVERHEAD PROJECTOR

[75] Inventors: Kenichi Shimizu, Kawasaki; Shigeru Suzuki, Yokohama; Kazuaki Iizuka, Tokyo, all of Japan

[73] Assignee: Ricoh Company, Ltd., Tokyo, Japan

[21] Appl. No.: 367,052

[22] Filed: Jun. 16, 1989

[30] Foreign Application Priority Data

Jun. 29, 1988 [JP] Japan .................................. 63-159421
Jan. 25, 1989 [JP] Japan .................................... 1-14147

[51] Int. Cl.⁵ .............................................. G03B 21/10
[52] U.S. Cl. .............................. 353/119; 353/DIG. 3; 353/99
[58] Field of Search .............. 353/119, 98, 99, 77-79, 353/DIG. 3, DIG. 5, 63, 65-67

[56] References Cited

U.S. PATENT DOCUMENTS 3,167,998 2/1965 Appeldorn et al. ....... 353/DIG. 3 X
4,629,299 12/1986 Okano et al. ................ 353/79 X
4,647,166 3/1987 Franken et al. .................. 353/79

FOREIGN PATENT DOCUMENTS 51-2246 1/1976 Japan .
55-57840 4/1980 Japan .
57-39041 3/1982 Japan .
57-180334 11/1982 Japan .
60-2585 1/1985 Japan .
60-4174 2/1985 Japan .
60-44033 3/1985 Japan .
60-82625 6/1985 Japan .
61-2650 1/1986 Japan .
61-13843 1/1986 Japan .
62-30233 2/1987 Japan .

OTHER PUBLICATIONS

IBM Tech Disc. Bul. Compact Expandable Viewer by R. E. Cox vol. 13, #12 5/71.

Primary Examiner—Harry N. Haroian
Attorney, Agent, or Firm—Oblon, Spivak, McClelland, Maier & Neustadt

[57] ABSTRACT

An overhead projector comprises, a main body, a light source disposed in the main body for emitting a light, a Fresnel lens disposed on an upper surface of the main body, an internal mirror for reflecting the emitted light toward the Fresnel lens, disposed rotatably in the main body such that a portion of the internal mirror is protruded from a bottom of the main body to an outside of the main body upon a use of the projector and is accommodated in the main body upon a non-use of the projector, an arm connected with the main body at one longitudinal end thereof, a projection lens held by the other longitudinal end of the arm for focusing the reflected light which has passed through the Fresnel lens and an original for a projection placed on the Fresnel lens, and a projection mirror for directing the focused light from the projection lens toward a screen.

10 Claims, 14 Drawing Sheets

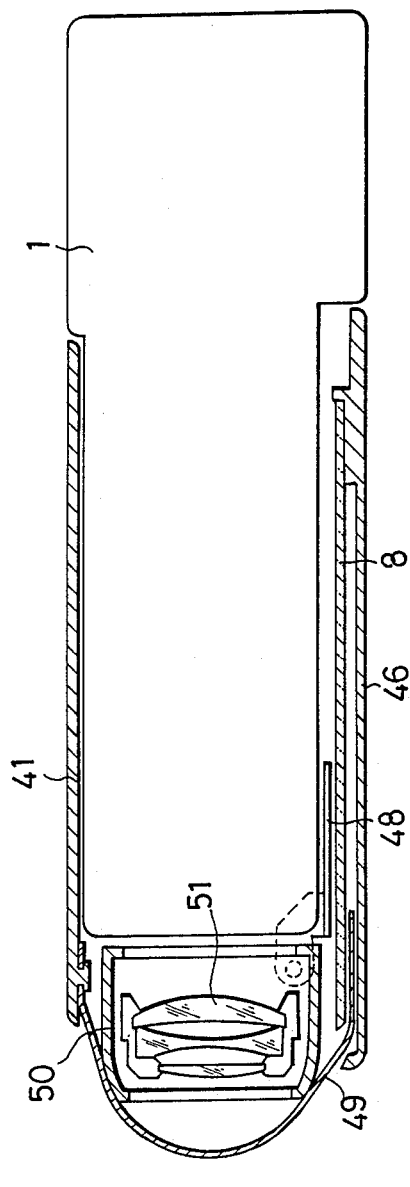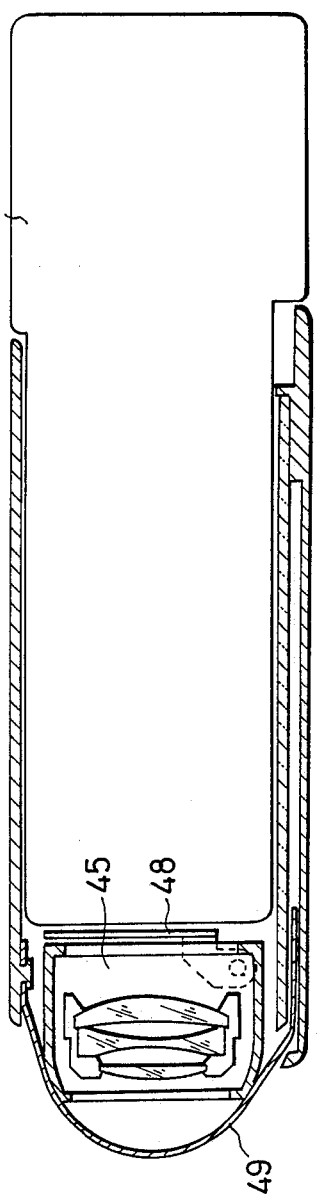

OVERHEAD PROJECTOR

FIELD OF THE INVENTION

The present invention concerns an overhead projector (hereinafter simply referred to as OHP) and, particularly, it relates to a light transmission type OHP which can be tucked into a compact form when it is not used.

OHP includes two types, that is, a transmission type and a reflection type each of which has advantages and disadvantages, for example, as summarized in Table 1.

TABLE 1

| Comparison between transmission type OHP and reflection type OHP | | |
|---|---|---|
| | Advantage | Disadvantage |
| Transmission type OHP | 1. Even if a gap is present between an original and a platen, sharp image can be projected so long as it is within the depth of the projection range. 2. Color reproduction for a color original is satisfactory and bright image is obtained. | 1. It can not be arranged in a compact form upon tucking. |
| Reflection type OHP | 1. It can be arranged in a compact form upon tucking. | 1. Projection image is doubled if the original aparts from the platen even slightly. 2. Since light passes the original twice, color reproducibility for a color original is poor and the projected image is dark. |

The reflection type OHP can easily be made compact upon tucking since the optical path from a light source to an original can be arranged to the outside of the device. On the other hand, the reduction of the size in the transmission type OHP is difficult since the optical path from the light source to the original document has to be set within the apparatus.

The difficulty is attributable to the following reasons. That is, a light source is generally disposed opposed to a Fresnel lens just therebeneath and light is applied directly to an original placed on the Fresnel lens. It may be considered that if the light source is disposed nearer to the Fresnel lens, the distance for the optical path in the apparatus can be shortened to attain the reduction of the size. However, if the light source is brought nearer to the Fresnel lens, the central area is made brighter while the peripheral area is made darker at the surface of the original document to impair the uniform brightness. Further, the focal length f of a Fresnel lens generally has the following relationship, assuming the distance between a light source and the Fresnel lens as $l_1$ and the distance between the Fresnel lens and the projection lens as $l_2$:

$$1/f = 1/l_1 + 1/l_2$$

Accordingly, even if a uniform brightness can be obtained when the light source is brought closer to the Fresnel lens by means of improvement for a reflector, etc., the focal length of the Fresnel lens has to be shortened if the length $l_1$ is shortened and it is rather impossible to prepare such a Fresnel lens as having a short focal length and capable of covering a large size document. Although the reduction of size is difficult for the light transmission type OHP with the reason as described above, the reduction of size upon tucking has still been demanded therefor for the conveniency in transportation, because the light transmission type OHP has an advantage as described above which can not be obtained by the reflection type OHP.

Generally employed OHPs are designed for A4-size document both in transmission type or in reflection type, and the mean size of their main body is about 350 mm (width) × 400 mm (depth) × 300 mm (height), which is usually inconvenient to carry with.

Originals prepared by instamatic cameras, etc., which have the size of 68 mm × 90 mm (which is much smaller than conventional originals) and are of full color transparency, have been used generally as originals for OHPs in recent years. However, there has not yet been an OHP exclusively used for such a small size original and an attachment to be mounted to conventional OHPs for projecting the original of such small size has become popular. FIG. 21 shows such an attachment and FIG. 22 shows the state of using such an attachment. In these figures, an attachment 101 is placed on the stage of an OHP 201 and a small size original 104 is placed on the stage 102 of the attachment 101. The light condensed by a Fresnel lens 204 of the OHP 201 efficiently illuminates the original 104 and change of the distance between a projection lens 203 of the OHP 201 and the original 104 is compensated by a compensation lens 103. Accordingly, although the conventional OHP can be utilized as it is by the use of the attachment 101, no compact arrangement can be obtained in this case when considering the system including OHP and the quality of the projected image is lowered since the compensation lens 103 is additionally used.

In the conventional light transmission type OHP, a lamp as a light source is disposed so as to oppose the Fresnel lens disposed to the upper surface of an OHP main body or to the lower surface of a stage on which an original is placed, and a projection lens and a projection mirror are disposed to the upper end of a pole or arm raised from the main body so as to receive the light emitted from the lamp and passing through the Fresnel lens.

In view of the above, various proposals have been made intending for the reduction of size, such as an OHP having a structure of tucking the arm when it is not used. For instance, Japanese Patent Publication Sho 51-2246 discloses an OHP in which a pole holding a projection head and rised from the main body case is turned down and enhoused into the case together with the head, and the stage surface is lowered when the OHP is not used. Further, Japanese Utility Model Publication Sho 60-4174 disclose such an OHP that the stage is once opened and a head support lever raised from one corner of a main body is lowered into a main body case to enhouses the lever together with the head and, thereafter, the stage is closed as a lid. Further, a constitution of a type in which a head is turned down and enhoused in the main body casing is disclosed in Japanese Utility Model Publication Sho 60-2585 and Japanese Utility Model Laid-Open Sho 57-39041 respectively.

However, since any of the conventional examples as described above is of a such type as enhousing the head portion together with the support arm to the inside of the main body case, no satisfactory space factor can be obtained and, accordingly, no sufficient effect can be attained for the reduction of size.

By the way, Japanese Patent Laid-Open Sho 55-57840 discloses a transmission type OHP in which light passing through the center of a stage is not made perpendicular but slanted to the stage and the light in the projection system is illuminated to an object to be projected while being slanted and deviated with an aim of preventing the trapezoidal deformation of a projected image. A reflection mirror disposed and fixed in the main body is used in the embodiment of this proposed OHP, wherein there is not any further specific descriptions as for the feature of the reflection mirror in this specification.

SUMMARY OF THE INVENTION

The present invention intends to dissolve the foregoing problems in the prior art and it is an object of the present invention to provide an OHP with an improved space factor and capable of attaining sufficient reduction of size.

The object of the present invention is achieved by a first overhead projector comprising, a main body, a light source disposed in said main body for emitting a light, a Fresnel lens disposed on an upper surface of said main body, an internal mirror for reflecting said emitted light toward said Fresnel lens, disposed rotatably in said main body such that a portion of said internal mirror is protruded from a bottom of said main body to an outside of said main body upon a use of said projector and is accommodated in said main body upon a non-use of said projector, an arm connected with said main body at one longitudinal end thereof, a projection lens held by the other longitudinal end of said arm for focusing said reflected light which has passed through said Fresnel lens and an original for a projection placed on said Fresnel lens, and a projection mirror for directing said focused light from said projection lens toward a screen.

According to the first overhead projector of the present invention, the rotatable internal mirror disposed between the light source and the Fresnel lens is partially protruded from the bottom of the main body upon the use of the overhead projector, while it is accommodated within the main body upon the non-use of the overhead projector. Accordingly, the space factor of the first overhead projector can be improved extremely to attain a sufficient reduction of size.

The object of the present invention is also achieved by a second overhead projector comprising, a main body, a light source disposed in said main body for emitting a light, a Fresnel lens disposed on an upper surface of said main body, an internal mirror for reflecting said emitted light toward said Fresnel lens, disposed rotatably in said main body such that a portion of said internal mirror is protruded from a bottom of said main body to an outside of said main body upon a use of said projector and is accommodated in said main body upon a non-use of said projector, an arm rotatably connected with said main body at one longitudinal end thereof so as to be raised from said main body and turned down to said main body, a projection lens rotatably connected with the other longitudinal end of said arm for focusing said reflected light which has passed through said Fresnel lens and an original for a projection placed on said Fresnel lens such that said projection lens is accommodated in contact with a side of said main body when said arm is turned down to said side of said main body upon said non-use, a projection mirror for directing said focused light from said projection lens toward a screen, a spring member disposed at said arm for resiliently biasing said projection lens, and a stopper means disposed at said arm for holding said projection lens in parallel with said Fresnel lens in association with said spring member upon said use.

According to the second overhead projector of the present invention, in addition to the effect of the first overhead projector, the projection lens rotatably connected with the arm is accommodated in contact with a side of the main body when the arm is turned down upon the non-use of the projector, therefore the space factor of the second overhead projector can be more improved than the first overhead projector.

The object of the present invention is achieved by a third overhead projector comprising, a main body, a light source disposed in said main body for emitting a light, a Fresnel lens disposed on an upper surface of said main body, an internal mirror for reflecting said emitted light toward said Fresnel lens, disposed rotatably in said main body such that a portion of said internal mirror is protruded from a bottom of said main body to an outside of said main body upon a use of said projector and is accommodated in said main body upon a non-use of said projector, an arm rotatably connected with said main body at one longitudinal end thereof in such a manner as to be raised from said main body upon said use and turned down to said main body upon said non-use, a projection lens unit including a projection lens held by the other longitudinal end of said arm for focusing said reflected light which has passed through said Fresnel lens and an original for a projection placed on said Fresnel lens, and adapted to be rotated and accommodated so as to be in contact with a side face of said main body, a projection mirror held by the other longitudinal end of said arm for directing said focused light from said projection lens toward a screen, and adapted to be rotated and accommodated in such a manner as to be in contact with a bottom of said main body, and a pair of legs disposed at both sides of said main body opposed to each other at said bottom, being bendable at a central portion thereof and resiliently biased by a spring such that said leg is straightened upon turning down said arm, and is adapted to be pushed at one end thereof by an end portion of said arm and thereby protruded downwardly at both ends thereof upon raising said arm.

According to the third overhead projector of the present invention, in addition to the effect of the first overhead projector, the projection lens unit including the projection lens is rotated and accommodated so as to be in contact with a side face of the main body when the arm is turned down upon the non-use of the projector, and a pair of legs at the bottom of the main body are protruded downwardly only when the arm is raised upon the use of the projctor, therefore the space factor of the third overhead projector can be more improved than the first overhead projector.

BRIEF DESCRIPTION OF THE DRAWINGS

FIGS. 15(a, b) are views illustrating the state where the lens cover covers the portion above the lens and the tucked state of a light screening plate in this case upon tucking OHP;

DETAILED DESCRIPTION OF THE PREFERRED EMBODIMENT

Figure 1:
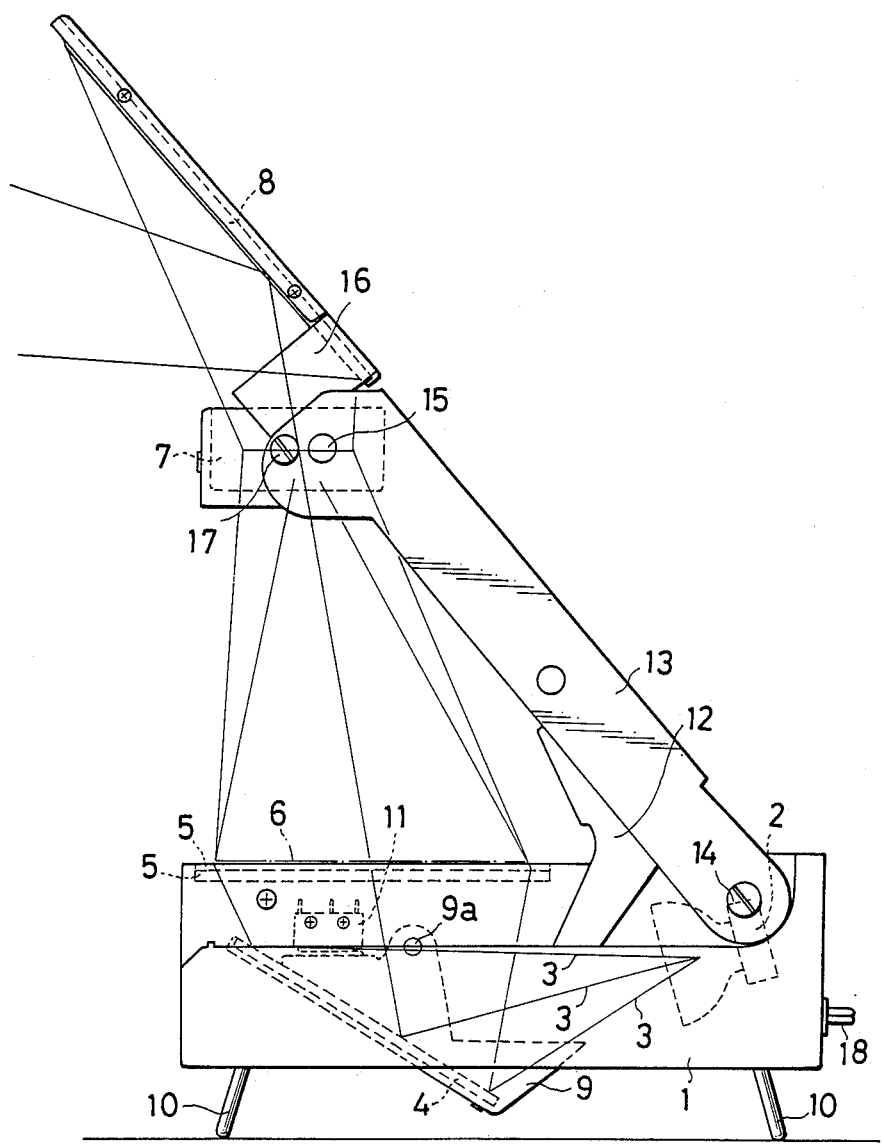
FIG. 1 is a view illustrating the projection state of an OHP in the first embodiment according to the second overhead projector of the present invention.

Preferred embodiment of the present invention are to be explained in details referring to the drawings.

Figure 2:
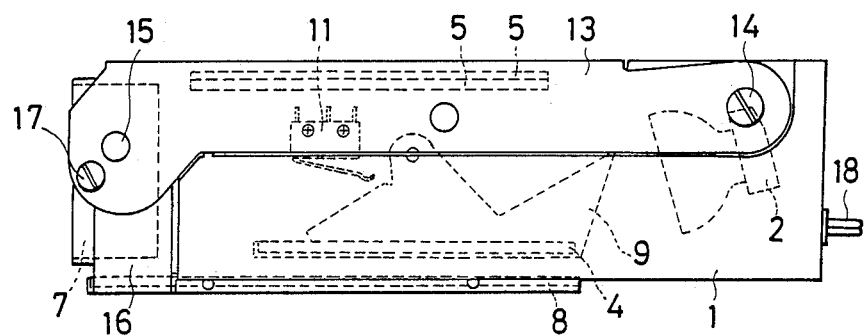
FIG. 2 is a view illustrating the tucked state of the OHP in the first embodiment.
Figure 3:
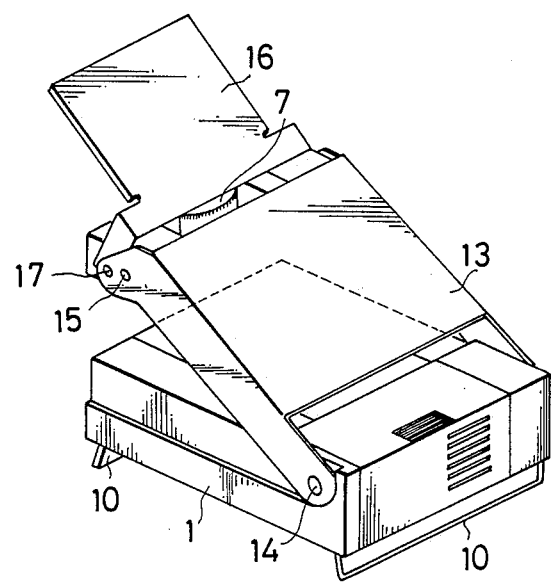
FIGS. 3 and 4 are, respectively, outer views corresponding to the states shown in FIGS. 1 and 2 respectively.
Figure 4:
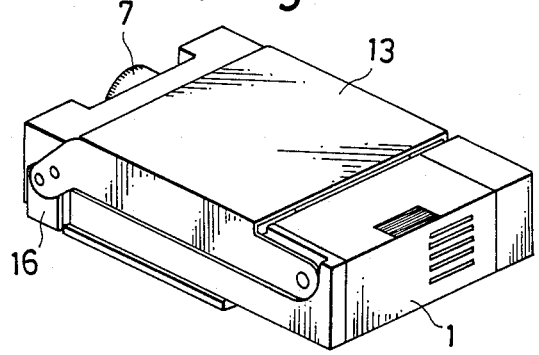

FIGS. 1 and 2 show an OHP as the first embodiment according to the second overhead projector of the present invention in which FIG. 1 shows the OHP in a projection state and FIG. 2 shows the OHP in a tucked state respectively. FIGS. 3 and 4 are, respectively, perspective views in each of the states. In FIG. 1 through FIG. 4, there are shown an OHP main body 1, a light source 2, that is, a halogen lamp disposed in the main body 1 and optical rays 3 of light emitted from the halogen lamp 2, an internal mirror 4 disposed in the main body 1, a pair of Fresnel lens 5 disposed to the upper surface of the main body 1, on which a light permeable original 6 (also referred to as transparency TP) is placed upon projection, a projection lens 7 and a projection mirror 8 for guiding the light passing through the projection lens 7 to a screen not illustrated.

A bracket 9 holding the inner mirror 4 is made rotatable around a fulcrum 9a and a portion of the internal mirror 4 is protruded from the bottom of the main body 1 upon projection. In this case, the main body 1 is kept at a predetermined distance from the surface of a table by a retractable leg 10. Further, a microswitch 11 disposed between a power source and the halogen lamp 2 is disposed to the inside of the main body 1 and an actuator of the microswitch 11 is raised by the bracket 9 upon projection to turn the micro switch 11 to ON. On the other hand, when the internal mirror 4 is tucked into the main body 1 upon tucking state, the microswitch 11 is turned OFF to disconnect the halogen lamp 2 from the power source.

Figure 5A:
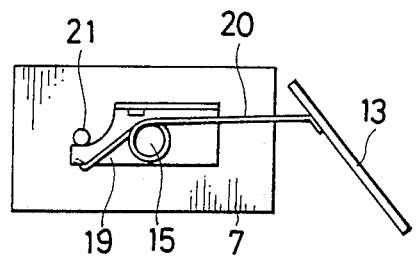
FIGS. 5(a, b, c) are explnatory views for the tucking operation of a projection lens.

An arm 13 is rotatably connected, at one end, to the main body 1 and adapted to rotatably hold, at the other end, the projection lens 7 and the projection mirror 8 respectively. A lock lever 12 is disposed for locking the arm 13 at a predetermined position and an angle when the arm 13 is raised. The projection lens 7 is made rotatable to the arm 13 around a pin 17 as a fulcrum. As shown in FIG. 5(a), a pressing bracket 19 secured integrally with the projection lens 7 is urged by a spring 20 to a positioning pin 21 secured to the arm 13 and the lens 7 is so positioned as is in prallel with the Fresnel lens 5 upon projection. Further, the projection mirror 8 is adapted such that it is fixed at an optional position.

With such a constitution, light emitted from the halogen lamp 2 is reflected on the internal mirror 4, passes through the Fresnel lens 5 and the origiinal placed thereon and is then collected into the projection lens 7. The light passing through the projection lens 7 is reflected on the projection mirror and directed to a screen, on which the origiinal image is magnified and displayed.

Figure 5B:
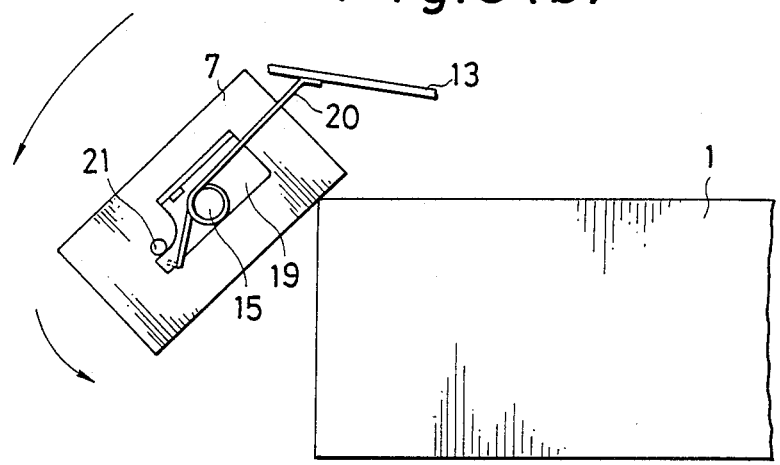
Figure 5C:
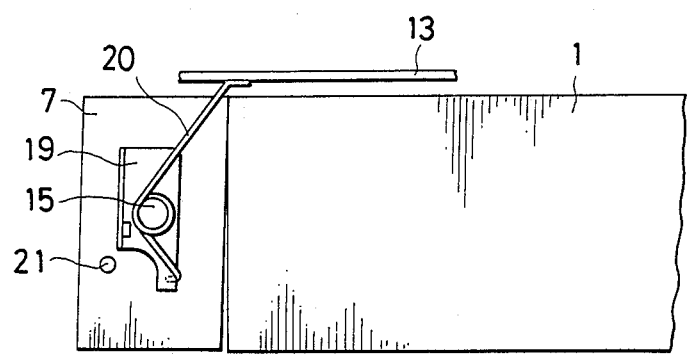

Then, upon tucking the OHP when it is not used, as the lock lever 12 is moved rightwardly, the lock for the arm 13 is released to rotate the arm 13 leftwardly around the pin 14 as the center. When the arm 13 comes over the main body 1, the projection lens 7 abuts against the edge of the main body 1 as shown in FIG. 5(b) and, as a result, it further rotates around the pin 15 as a fulcrum against the resilient force of the spring 20 and tucked in contact with the side of the main body 1 as shown in FIG 5(c). On the other hand, the bracket 16 of the mirror 8 is made rotatable around the pin 17 as a center and, accordingly, after the projection lens has been tucked on the side of the main body 1, the mirror 8 is tucked in contact with the lower surface of the main body 1.

In this case, the leg 10 and, further, the internal mirror 4 are also tucked into the main body by being pushd by the projection mirror 8. The tucked state is as shown in FIG. 2 or FIG. 4.

When the bracket 9 rotates so as to stow the internal mirror 4 in the main body 1, the actuator for the microswitch 11 is released to turn the microswitch 11 to OFF, thereby disconnect the halogen lamp 2 from the power source. Accordingly, even if the main switch is kept ON, the halogen lamp 2 is not lighted.

Figure 6A:
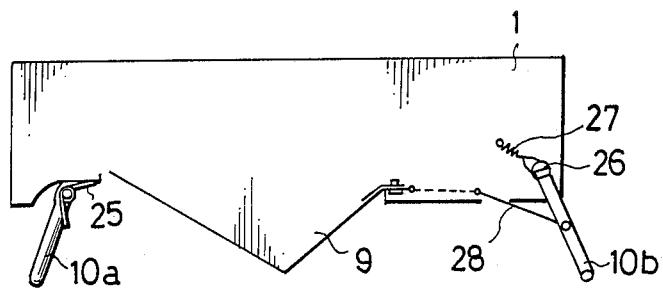
FIGS. 6(a, b, c) are constitutional views for one embodiment of legs.
Figure 6B:
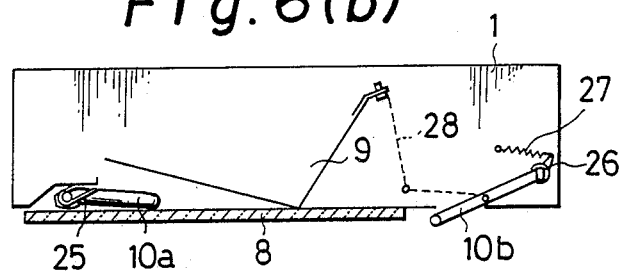
Figure 7:
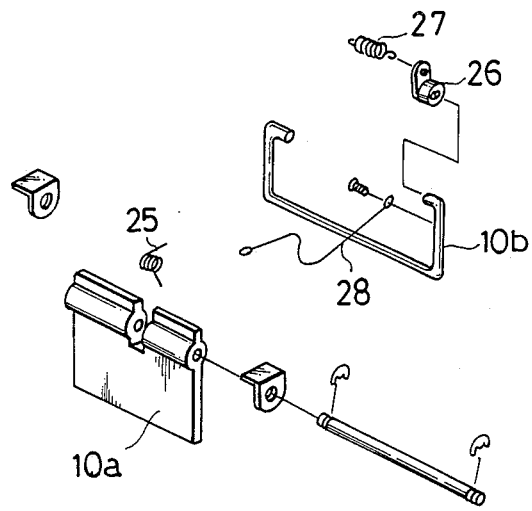
FIG. 7 is an exploded perspective view for the legs.

Description is to be made for the mechanism of stowing the leg 10 by tucking the projection mirror to the lower surface of the main body. FIG. 6 shows one embodiment and FIG. 7 is an exploded perspective view thereof. One leg 10a is always biased resiliently by a spring 25 in the opening direction. The other leg 10b has a shape of a bent rod having a bent top end of an elliptical cross section and is inserted into a bracket 26. The bracket 26 is biased resiliently by a spring 27 in the direction of opening the leg 10b. Further, the leg 10b is connected with the bracket 9 of the internal mirror by means of a wire 28.

Then, when the head portion is folded upon tucked state and the projection mirror 8 is tucked to the lower surface of the main body 1, the leg 10a is pushed and enhoused into the main body by the bracket 16 to which the projection mirror 8 is attached. On the other hand, since the bracket 9 of the internal mirror is pushed and enhoused into the main body, the wire 28 is pulled and the other leg 10b is also tucked. When the projection mirror 8 is removed, the legs 10a and 10b are opened automatically by means of resilient spring 25 and 27 respectively.

Figure 8:
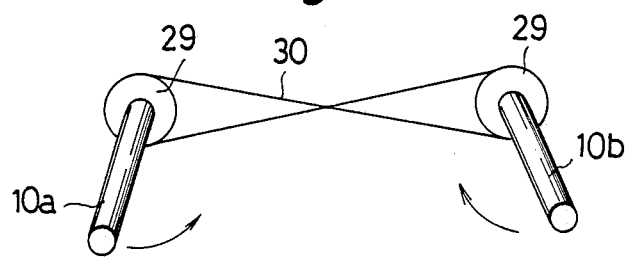
FIG. 8 is a constitutional view for another embodiment of legs.

As shown in another embodiment of FIG. 8, the legs 10a and 10b may be connected by means of a pulley 29 and a crossing wire 30, so that when the leg 10a is enhoused, the leg 10b is also rotated and enhoused by the rotation thereof. It is assumed here that the legs 10a and 10b are always biased resiliently in the opening direction.

Figure 9A:
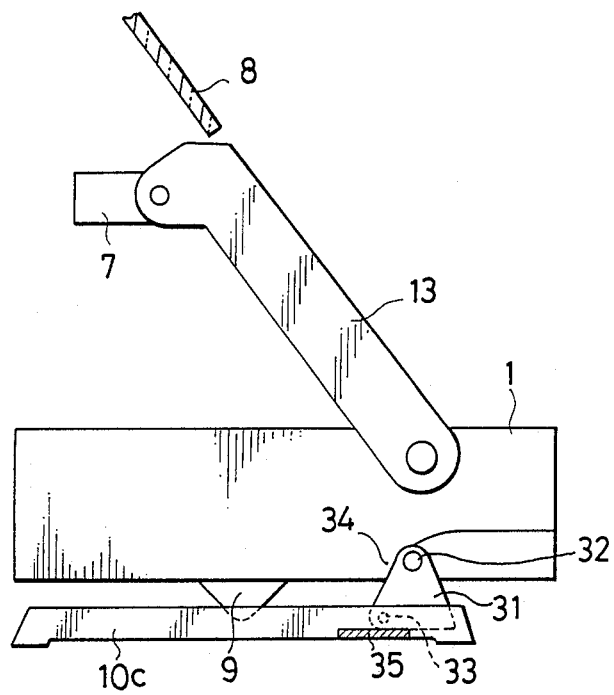
FIGS. 9(a, b) are constitutional views for a further embodiment of legs.
Figure 9B:
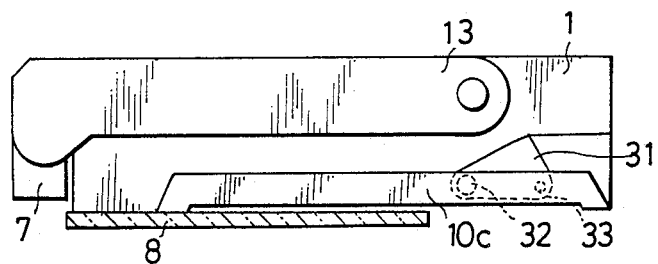

FIG. 9 shows a further embodiment for the leg, in which a leg 10c and the main body 1 are connected by means of a bracket 31. Shafts 32 and 33 are rotatable. Upon projection, the leg 10c is drawn out and the bracket 31 is abutted against a stopper portion 34 on the side of the main body and a stopper portion 35 on the side of the leg respectively to secure the position thereof. When the projection mirror 8 is folded, the leg 10c is pushed to rotate the bracket 31 and the leg 10c is automatically tucked in the main body 1.

Figure 10:
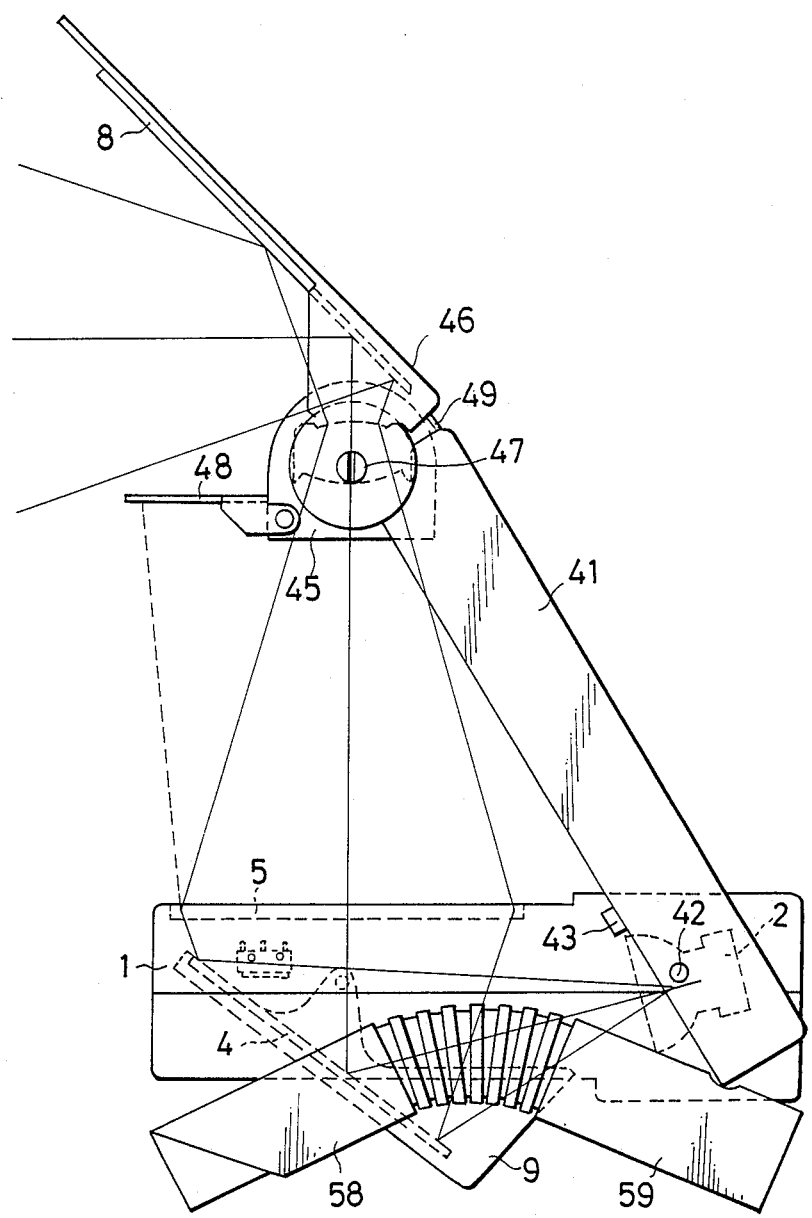
FIG. 10 is a view illustrating the projection state of an OHP in the second embodiment according to the third overhead projector of the present invention.
Figure 11:
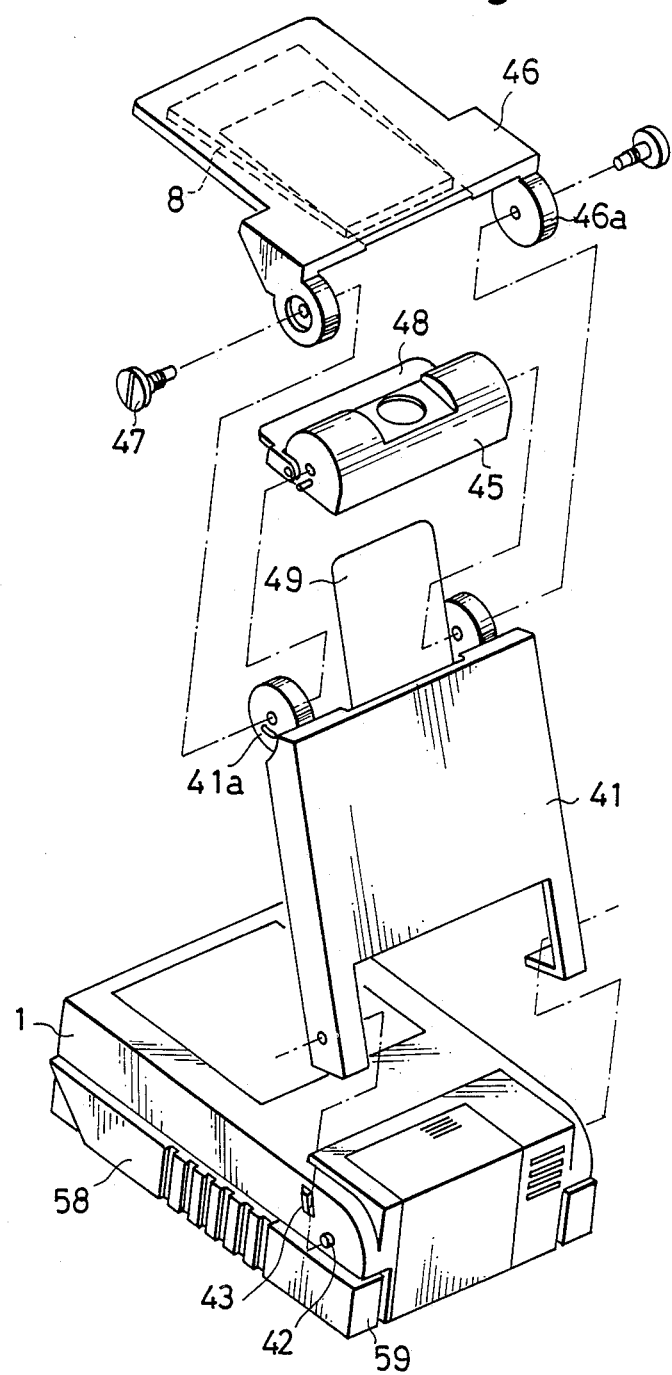
FIG. 11 is an exploded perspective view of the OHP shown in FIG. 10.

FIG. 10 shows an OHP as the second embodiment according to the third overhead projector of the present invention to which various improvements are made. FIG. 11 is an exploded perspective view for the embodiment shown in FIG. 10.

Figure 12A:
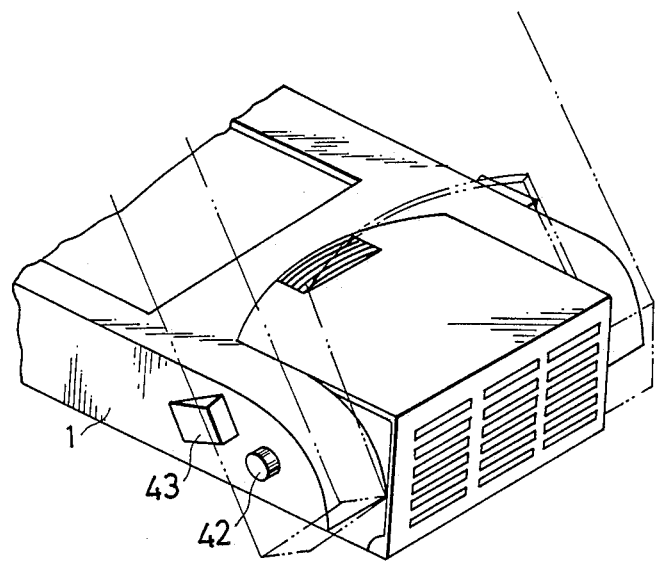
FIGS. 12(a, b) are constitutional views for an arm stopper portion.
Figure 12B:
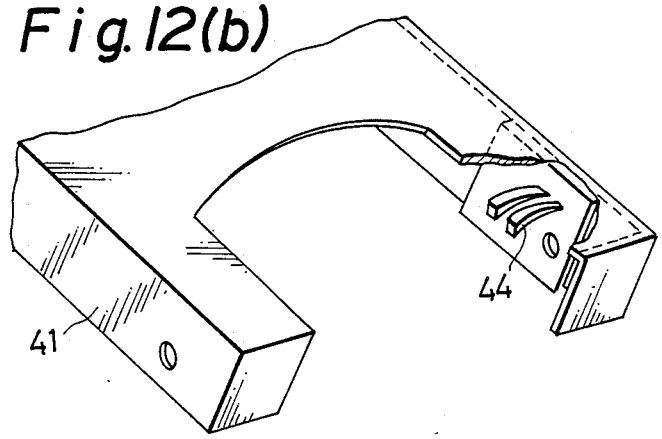

In the first embodiment, when the arm 13 is raised, it is fixed at a predetermined set position by the lock lever 12. In this embodiment, however, an elastically deformable resin molding product is used for an arm 41 corresponds to the arm 13, and protrusions 44 as shown in FIG. 12(b) are integrally disposed to the inner wall thereof and, a stopping protrusion 43 is also disposed integrally on the side of the main body 1 so as to correspond to them as shown in FIG. 12(a). Then, when the arm 41 rotatably supported at one end on a fulcrum 42 is raised, the arm deforms elastically to ride over the protrusions 43 and stopped at that position in a set state. The protrusions 43 and 44 are tapered respectively such that they can be easily ridden over, while the set arm 41 is adapted such that it is not lowered gravitationally but ca easily ride over the protrusions upon turning down by applying a slight force manually. With such a constitution, the lock lever as shown in the first embodiment is no more necessary.

At the other end of the arm 41, a projection lens unit 45 and a stay 46 for holding the projection mirror 8 are rotatably held respectively. In this case, both end faces of the projection lens unit 45 opposed to each other are positioned to the inside of holding portions 41a disposed on both lateral ends at the other of the arm and mounting portions 46a of the stay 46 are situated to the outside of the holding portions 41a, and rotatably held coaxially with pivot screws 47. The projection lens unit 45 is resiliently biased so as to rotate to a predetermined angle as the arm 41 is raised and set to a predetermined projection position (in the same manner as in the first embodiment). Further, the projection mirror 8 is attached to the stay 46, for example, by means of adhesives and it can rotate relative to the arm 41 such that a projecting angle of elevation from 0 to 20 degree can be obtained and can self-hold at an optional angle by means of breaking frictional force.

Light screening plate 48 is disposed rotatably to the projection lens unit 45 so as to prevent the light emitted from the light source 2 but not passing through the projection lens from reaching directly to the projection mirror 8. Without the light screening plate, a portion of incompletely condensed light emitted from the light source 2 and scattered in the Fresnel lens 5 reaches the projection mirror 8 directly not passing through the lens and is reflected and illuminated on the screen, thereby causing reduction in the contrast and unevenness in the luminosity. Accordingly, by disposing the light screening plate 48, the contrast can be increased to improve the quality of the projected image. The light screening plate 48 is always biased resiliently by a spring not illustrated such that it always protrudes horizontally on the side of the lens unit 45. Upon tucking :rt can be folded as described later.

It is desirable that the light screening plate 48 is made of rubber with a rubber hardness of about 80° to 90° so as to readily absorb impact shocks in order to prevent that the light screening plate 48 is damaged by the abutment against the surface of a table when the arm 41 is lowered upon tucking the OHP.

In the first embodiment, the projection lens is exposed on the side of the main body upon tucking when the OHP is not used, to possibly stain the lens with finger prints or causing damages. In view of the above, a lens cover is preferably equipped for consealing to protect the lens upon tucking. However, lens caps, etc. such as of usual cameras may be dropped or missed and, further, they are inconvenient to use. In this embodiment, a lens cover of a minimum size, with no dropping and capable of automatically closing and exposing the surface of the lens depending on projection and tucking is disposed.

Figure 13:
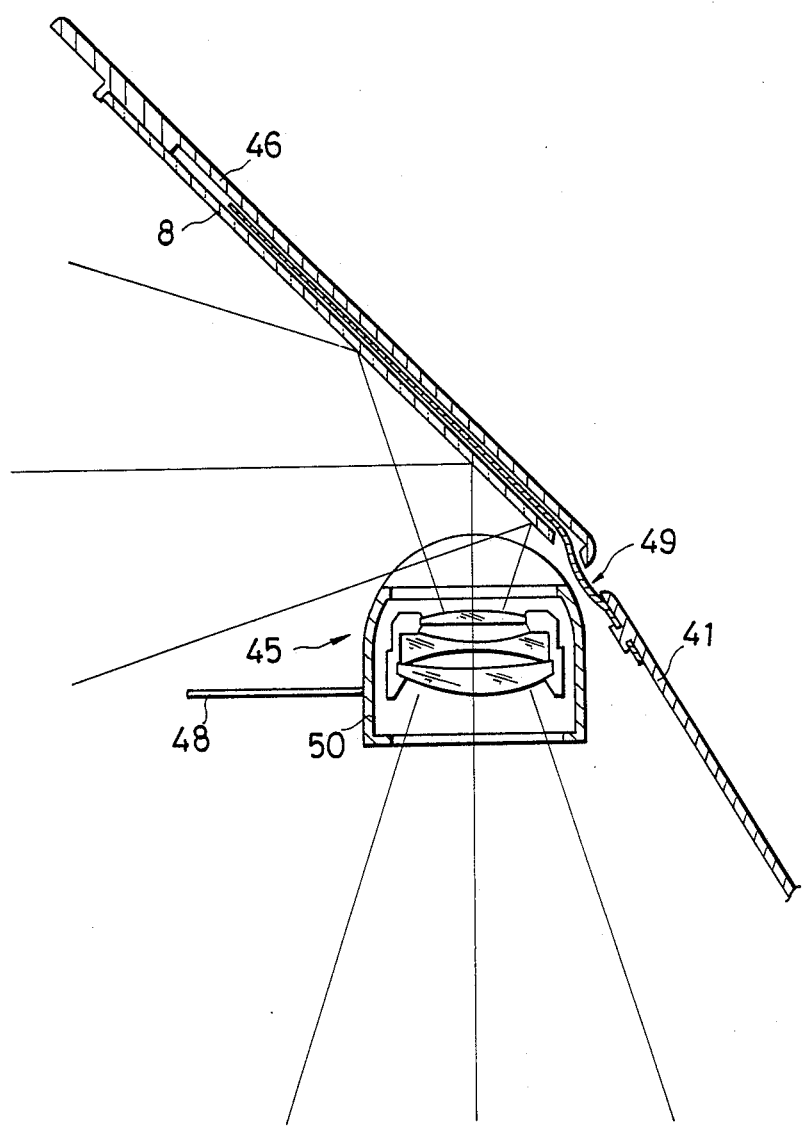
FIGS. 13 and 14(a, b) are, respectively, cross sectional views for the tucked portion of a lens cover.
Figure 14A:
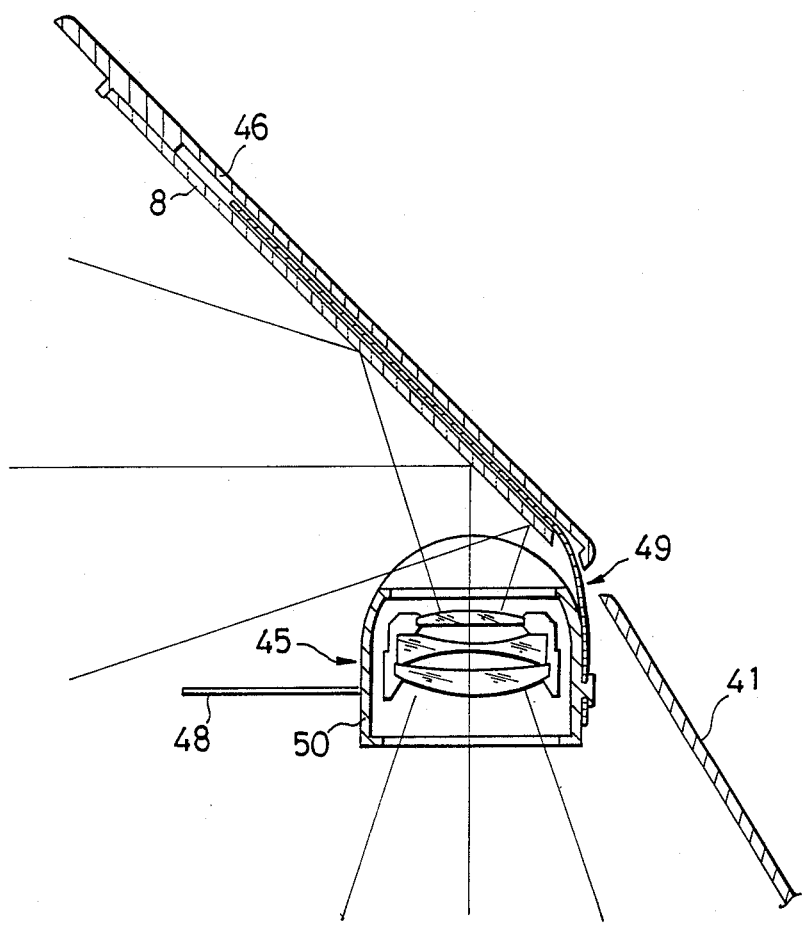
Figure 14B:
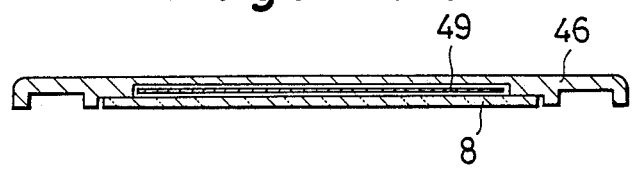

Such a type of lens cover 49 is constituted with a flexible thin plate or sheet made of metal or resin. The lens cover 49 is fixed at one end to the arm 41 as shown in FIG. 13, or fixed at one end to a housing 50 of a projection lens unit 45 as shown in FIG. 14, while the other end, i.e., a free end, is tucked at the back of the projection mirror 8 in the stay 46. Then, as shown in FIG. 15(a), when the arm 41 is turned down and the lens unit 45 and the projection mirror 8 are rotated and tucked so as to be in contact with the side of the main body 1 or the bottom of the main body 1 respectively, the lens cover 49 tucked in the stay 46 is successively drawn out to cover a portion above the lens so as to hinder the finger chip, etc. from entering into the surface of a projection lens 51. This can completely protect the lens from being stained with finger prints or being damaged.

Since the lens cover 49 is made of metal or resin and has an appropriate rigidity, when the arm is raised and set to the projection position, the free end of the lens cover 49 successively intrudes into the tucking portion such as the stay, to completely expose the projection lens at the set state and provide a state capable of automatic projection.

Alternatively, one end of the lens cover 49 may be secured to the stay 46, while the free end may be inserted detacheably in the arm 41. Further, when the OHP is folded, the light screening plate 48 can be tucked between the lower surface of the main body 1 and the projection mirror 8 as shown in FIG. 15(a) or between the side of the main body and the lens unit 45 as shown in FIG. 15(b), thereby causing no troubles for tucking.

In the focus control mechanism of conventional OHPs, there are generally known those in which a plurality of stripes or grooves are engraved to a helicoid screw or lens mount, to which a pin protruded from an outer cylinder is engaged to secure the outer cylinder to the main body and the lens is moved vertically by rotating an inner cylinder, or a pin of the lens mount is inserted into the grooves of the outer cylinder. In this structure, however, there have been problems that the entire outer diameter size is increased in view of the necessity for the inner cylinder and the outer cylinder, a great length is required to the outer cylinder for vertically moving the lens mount, reduction of the size is difficult and the cost is increased.

Figure 16A:
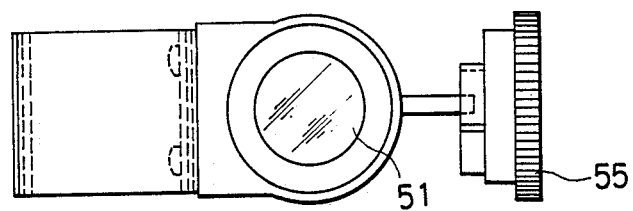
FIGS. 16(a, b, c) are constitutional views for one embodiment of a focus control mechanism.
Figure 16B:
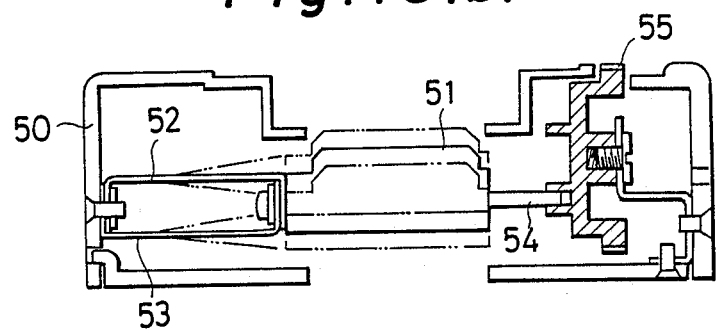
Figure 16C:
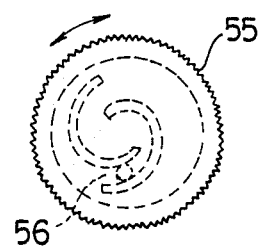

In this embodiment, a focus control mechanism of a simple structure, small in the size and of a reduced cost is disposed. FIG. 16 shows one embodiment of the focus control mechanism, in which one side of a projection lens 51 is displaceably supported by upper and lower parallel leaf springs 52 and 53 secured at one end to housing 50. An engaging pin 54 is disposed on the side of the projection lens 51 opposite to that for the supporting portion and the top end of the pin is engaged with a cam 56 having a control knob 55 at the top end. Then, when the knob 55 is rotated, the engaging pin 54 moves along the cam groove, by which the projection lens 51 displaces vertically thereby enabling focus control. If the projection lens 51 displaces vertically, since the plate thickness, length and the width of a pair of the upper and the lower leaf springs 52 and 53 are quite identical, they produce identical distorted state and, as a result, move vertically while keeping the optical axis of the lens to a completely vertical state. In this case, although the lens is slightly shifted in the longitudinal direction of the leaf spring 52 and 53, such a shift causes no problems at all in view of the practical use In this constitution, since the leaf springs are used, a force tending to return the lens itself always to a neutral point is generated and, accordingly, the lens can be secured to a desired position by disposing a cam face only on the side of supporting the recoiling force of the leaf springs and the cam face and the engaging pin 54 are brought into close contact with no gap.

Figure 17:
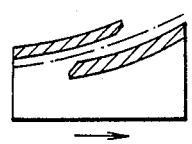
FIG. 17 is a developed view for a cam in this embodiment.

In the constitution shown in FIG. 16, the control knob 55 and the leaf springs 52, 53 are intersected in parpendicular with each other, the cam groove is formed as a spiral type and the leaf springs are used on both sides of the nuetral point. The cam developing view is shown in FIG. 17.

Figure 18:
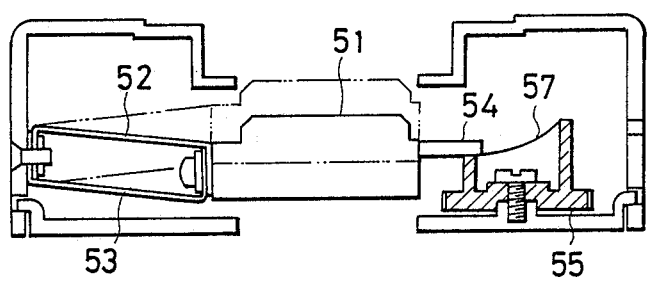
FIG. 18 is a constitutional view of a further embodiment of th focus control mechanism.
Figure 19:
FIG. 19 is a developed view for a cam in this embodiment.

FIG. 18 shows a further embodiment of the focus control mechanism in which a focus control knob 55 is disposed in parallel with leaf springs 52, 53, in which a cam 57 has a sloped shape and the leaf springs are used in the identical displacing direction. The cam development view is shown in FIG. 19.

The moving amount of a lens for focusing is shown by the following equation:

$$\frac{1}{a} + \frac{1}{b} = \frac{1}{f} \therefore b = f + \frac{f^2}{a-f}$$

where;
f: focal length of lens
a: distance from lens to original
b: distance from lens to screen.

Accordingly, as the distance from a lens to an original is smaller, the focused distance to the screen surface changes greatly in an inverse proportion. That is, when focusing is made to a predetermined screen position, as the distance between the lens and the original is smaller, that is, as the position of the lens is situated lower, more fine control is necessary as compared with the case where the lens is situated higher.

In view of the above, the shape of the cam is preferrably made not linear but hyperbolic in a cam development view in which the relationship between the displacement of a cam and the rotational angle of the cam, that is, of the control knob is expressed by a graph, so as to make the rotational angle of the control knob and the focusing position being completely in proportion with each other to thereby remarkably facilitate the focusing operation. From a practical point of view, substantially the same effect as above can also be obtained by preparing a shape approximate to a hyperbola, that is, by making the slope on the side of high magnifying ratio more moderate than the slope on the side of low magnifying ratio.

Also in this embodiment, since the internal mirror 4 is protruded out of the bottom of the main body 1 upon projection, legs for lifting the main body 1 are necessary and a structure in which legs come out automatically upon use is desirable.

Figure 20A:
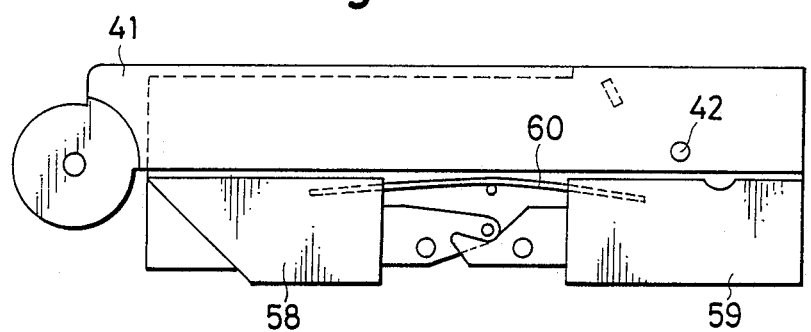
FIGS. 20(a, b) are constitutional views for the legs.
Figure 20B:
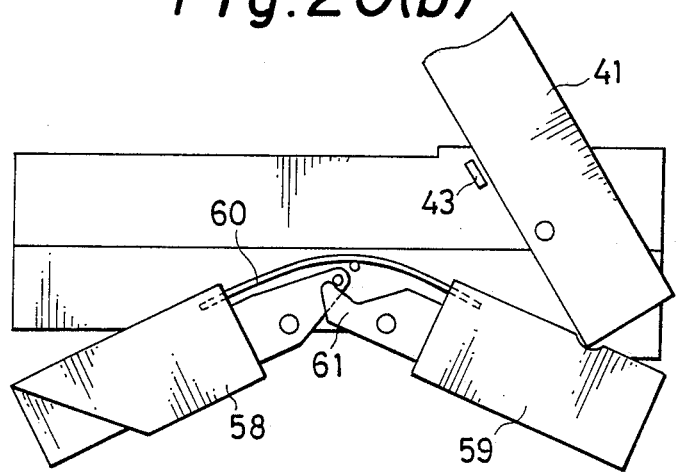
Figure 21:
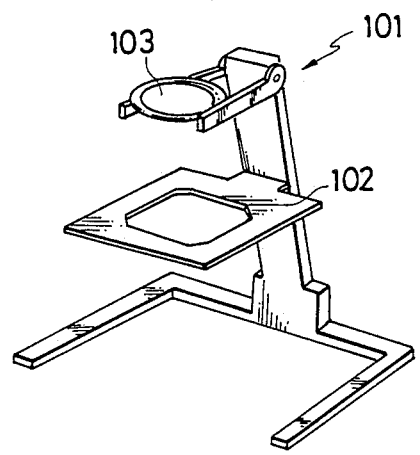
FIG. 21 is a perspective view of an attachment used for a conventional OHP.
Figure 22:
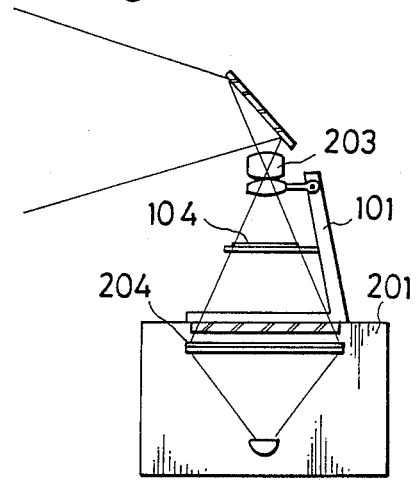
FIG. 22 is a view illustrating the state of using the attachment shown in FIG. 21.

FIG. 20 shows legs of this type, in which a foreleg 58 and a hind leg 59 are disposed at the bottom on both sides of the main body respectively and they can be flexed at the central portion. That is, they are resiliently biased by a spring 60 such that they stand vertically when the arm 41 is turned down as shown in FIG. 20(a). When the arm 41 is raised to set into a state capable of projection as shown in FIG. 20(b), the hind leg 50 is pushed by the end of the arm 41 and, as a result, the hind leg 59 is protruded downwardly and the foreleg 58 is also protruded downwardly by way of a cam mechanism 61. Since the arm 41 is secured by a protrusion 43 in the set state, the legs are also secured.

SPECIFIC EXAMPLE

As a specific example for the OHP according to the present invention, an OHP having specifications as shown in Table 2 is manufactured.

TABLE 2

| Main specification in the example | |
| --- | --- |
| Size upon tucking | 230 (W) × 170 (D) × 60 (H) |
| Size upon projection | 185 (W) × 170 (D) × 335 (H) |
| Lamp | 12 V, 75 W, halogen lamp: with elliptic reflector |
| Fresnel lens | f = 61 mm (two joined lenses, each of: f = 122 mm) |
| Projection lens | f = 105 mm |

TABLE 2-continued

| Main specification in the example | |
| --- | --- |
| Size of platen | 100 mm square |
| Lamp-Fresnel lens | 133 mm |
| Original-projection lens | 113.3 mm–121.8 mm |
| Projection ratio | 6 X–11.7 X |
| Projection distance | 700 mm–1300 mm |
| Weight | 1.5 kg |

In this example, although the distance from the lamp to the Fresnel lens is 133 mm, the height upon tucking can be restricted to 60 mm the provision of the rotatable internal mirror.

By the way, in a case where the distance from the lamp to the Fresnel lens is set to 133 mm in conventional OHPs, the OHP height upon tucking is expected to be:

| | |
| --- | --- |
| (A) From 180 to 200 mm | if no internal mirror is present |
| (B) From 90 to 100 mm | if an internal mirror is not rotatable |

Thus, it can be seen that the rotarable internal mirror 4 in the present invention contributes much to the reduction of size in OHP. This example has an effective image area size of 68 mm×90 mm, is used exclusively for a full color transparency original prepared in instamatic cameras, etc. and is a transmission type OHP suitable to such an application use in which such portability as capable of being enhoused in an attache case is considered important.

As apparent from the foregoing explanations for the embodiments, the present invention provides a light transmission type OHP in which the internal mirro is disposed between the light source and the Fresnel lens and the projection head is held on the arm raised from the main body, wherein the arm, the projection lens and the projection mirror are tucked to the main body such that they are brought into contact with the upper surface, the side and the lower surface of the main body respectively when the OHP is not used. Further, the internal mirror is partially protruded from the bottom of the main body and the legs are opened as well upon projection, whereas they are enhoused to the inside of the main body and, accordingly, tucked in an extremely compact form. Accordingly, the space factor can be much improved and the reduction of thickness and size can be attained satisfactorily.

Further, since the electric circuit from the power source to the light source is disconnected when the internal mirror is enhoused, safety performance can be improved. Further, since the legs are protruded and retracted automatically, operationability is improved. In addition, since the Fresnel lens is concealed by the arm and the projection mirror is tucked with the mirror face being inside in the tucked state, they can be protected as well.

Furthermore, in the second embodiment, the projection lens is concealed by a lens cover and completely protected upon tucking. In addition, since the lens cover automatically exposes or closes the surface of the lens in accordance with setting or tucking, it is much easy to handle with and does not hinder the reduction of size.

Since the focus control mechanism is simple in the structure and reduced in the size as compared with a conventional inner-outer cylinder type, use of a bright lens is possible and remarkable cost reduction can be attained.

For the stopper mechanism upon lifting the arm, the structure is simplified such as saving of the lock lever by effectively utilizing resilient resin deformation.

The OHP according to the present invention is particularly advantageous as an OHP exclusively used for small sized originals, by which an OHP of highly desirable portability can be obtained and a compact OHP can also be obtained as an OHP used for large sized originals.

Many widely different embodiments of the present invention may be constructed without departing from the spirit and scope of the present invention. It should be understood that the present invention is not limited to the specific embodiments described in this specification, except as defined in the appended claims.

What is claimed is:

1. An overhead projector comprising,
a main body,
a light source disposed in said main body for emitting a light,
a Fresnel lens disposed on an upper surface of said main body,
an internal mirror for reflecting said emitted light toward said Fresnel lens, disposed rotatably in said main body such that a portion of said internal mirror is protruded from a bottom of said main body to an outside of said main body upon a use of said projector and is accommodated in said main body upon a non-use of said projector,
an arm rotatably connected with said main body at one longitudinal end thereof so as to be raised from said main body and turned down to said main body,
a projection lens rotatably connected with the other longitudinal end of said arm for focusing said reflected light which has passed through said Fresnel lens and an original for a projection placed on said Fresnel lens such that said projection lens is accomodated in contact with a side of said main body when said arm is turned down to said side of said main body upon said non-use,
a projection mirror for directing said focused light from said projection lens toward a screen,
a spring member disposed at said arm for resiliently biasing said projection lens, and
a stopper means disposed at said arm for holding said projection lens in parallel with said Fresnel lens in association with said spring member upon said use.

2. An overhead projector according to claim 1, wherein said projection mirror is connected rotatably with the other longitudinal end of said arm for holding said projection lens, said arm is adapted to cover an upper surface of said main body, and said projection lens and said projection mirror are adapted to be accommodated such that said projection lens and said projection mirror are in contact with said side and said bottom of said main body respectively when said arm is turned down to said side of said main body upon said non-use.

3. An overhead projector according to claim 2, further comprising a leg disposed at said main body and a leg accommodating means for automatically accommodating said leg such that an accommodating operation of said leg is interlocked with an accommodating operation of said projection mirror.

4. An overhead projector comprising, a main body, a light source disposed in said main body for emitting a light, a Fresnel lens disposed on an upper surface of said main body, an internal mirror for reflecting said emitted light toward said Fresnel lens, disposed rotatably in said main body such that a portion of said internal mirror is protruded from a bottom of said main body to an outside of said main body upon a use of said projector and is accommodated in said main body upon a non-use of said projector, an arm rotatably connected with said main body at one longitudinal end thereof in such a manner as to be raised from said main body upon said use and turned down to said main body upon said non-use, a projection lens unit including a projection lens held by the other longitudinal end of said arm for focusing said reflected light which has passed through said Fresnel lens and an original for a projection placed on said Fresnel lens, and adapted to be rotated and accommodated so as to be in contact with a side face of said main body, a projection mirror held by the other longitudinal end of said arm for directing said focused light from said projection lens toward a screen, and adapted to be rotated and accommodated in such a manner as to be in contact with a bottom of said main body, and a pair of legs disposed at both sides of said main body opposed to each other at said bottom, being bendable at a central portion thereof and resiliently biased by a spring such that said leg is straightened upon turning down said arm, and is adapted to be pushed at one end thereof by an end portion of said arm and thereby protruded downwardly at both ends thereof upon raising said arm.

5. An overhead projector comprising:
a main body;
a light source disposed in said main body for emitting a light;
a Fresnel lens disposed on an upper surface of said main body;
an internal mirror for reflecting said emitted light toward said Fresnel lens, disposed rotatably in said main body such that a portion of said internal mirror protrudes from a bottom of said main body to an outside of said main body upon a use of said projector and is accommodated in said main body upon a non-use of said projector;
an arm connected with said main body at one longitudinal end thereof;
a projection lens held by another longitudinal end of said arm for focusing said reflected light which has passed through said Fresnel lens and an original placed on said Fresnel lens for projection;
a projection mirror for directing said focused light from said projection lens toward a screen;
a leg disposed at said main body; and
a leg accommodating means for automatically accommodating said leg such that an accommodating operation of said leg is interlocked with said accommodating operation of said mirror.

6. An overhead projector according to claim 5, further comprising a switch means disposed at said main body and actuated by an accommodating operation of said internal mirror for disconnecting an electric path between said light source and a power source when said internal mirror is accommodated in said main body.

7. An overhead projector according to claim 5, further comprising a lens cover which is made of one of a flexible thin plate, sheet of metal, and resin, adapted to be accommodated in a stay of said projection mirror for holding said projection mirror when said arm is raised upon said use, and adapted to be drawn out interlocking with a rotating and accommodating operation of said projection lens and said projection mirror in such a manner as to cover a surface of said projection lens when said arm is turned down upon said non-use.

8. An overhead projection according to claim 5, further comprising,
a holding portion disposed at the other longitudinal end of said arm at both lateral ends of said arm,
a projection lens unit including said projection lens and rotatably held on an inside of said holding portion at both sides thereof opposed to each other, and
a stay for holding said projection mirror and rotatably held on an outside of said holding portion.

9. An overhead projector according to claim 5, wherein said projection lens is supported displaceably on one side thereof by a pair of upper and lower parallel leaf springs secured at one end of said each springs, an engaging portion of said projection lens disposed on the other side of said projection lens is engaged with a cam attached with a control knob, and focusing of said projector is controlled by displacing said projection lens by a rotation of said knob.

10. An overhead projector according to claim 5, further comprising:
a projection lens unit including said projection lens, and
a light screening plate disposed at said projection lens unit for preventing a portion of said reflected light which does not pass through said projection lens from directly reaching said projection mirror.

* * * * *